United States Patent [19]

Verble

[11] Patent Number: 5,125,765
[45] Date of Patent: Jun. 30, 1992

[54] SEAWALL CONSTRUCTION

[76] Inventor: Patrick R. Verble, 16001 E. 113th St., Fortville, Ind. 46040

[21] Appl. No.: 749,577

[22] Filed: Aug. 26, 1991

[51] Int. Cl.⁵ .......................... E02B 3/06; E02B 3/02
[52] U.S. Cl. ..................................... 405/31; 405/284; 405/286
[58] Field of Search ............... 405/284, 286, 15, 17, 405/21, 30, 31, 16

[56] References Cited

U.S. PATENT DOCUMENTS

| | | | |
|---|---|---|---|
| 905,596 | 12/1908 | Smith | 405/21 |
| 2,960,797 | 11/1960 | Frehner | 405/284 X |
| 3,802,205 | 4/1974 | Dickinson | 405/21 X |
| 3,820,343 | 6/1974 | Morren et al. | |
| 3,890,790 | 6/1975 | Lamy | |
| 3,990,247 | 11/1976 | Palmer | |
| 4,013,379 | 3/1977 | Bolding | |
| 4,073,145 | 2/1978 | Fair | |
| 4,175,888 | 11/1979 | Ijima | 405/31 |
| 4,190,384 | 2/1980 | Neumann | 405/284 |
| 4,231,680 | 11/1980 | Ijima | 405/286 X |
| 4,666,334 | 5/1987 | Karaus | 405/31 |
| 4,666,334 | 5/1987 | Karaus | |
| 4,801,220 | 1/1989 | Bores | |
| 4,840,516 | 6/1989 | Rambo | 405/30 X |
| 4,856,933 | 8/1989 | Tubbs, Jr. | |
| 4,917,543 | 4/1990 | Cole et al. | |

Primary Examiner—Randolph A. Reese
Assistant Examiner—J. Russell McBee
Attorney, Agent, or Firm—Barnes & Thornburg

[57] ABSTRACT

A seawall system comprising a concrete seawall and means for providing a footing upon which the seawall rests. The seawall has a lower portion provided to be below the normal water level and an upper portion provided to be above the normal water level, a top, a bottom to rest upon the footing means, a back to face the earth and away from the water, and a front to face the water. The front has an upper front panel above the normal water level and a lower front panel below the normal water level. The seawall is formed to have a plurality of recesses in the lower front panel providing nesting places and habitats for marine life and other wildlife normally found in the water environment.

20 Claims, 2 Drawing Sheets

SEAWALL CONSTRUCTION

BACKGROUND AND SUMMARY OF THE INVENTION

The present invention relates to seawalls, and more particularly to the provision of a seawall system comprising a concrete seawall formed to have recesses and shelves thereon to provide nesting places and habitats for marine life and other wildlife normally found in the water environment.

The prior art is replete with all types of seawall constructions including, of course, poured concrete seawalls and prefabricated concrete seawalls. In some cases, concrete seawalls are poured in place upon footings which are previously poured in place. In some cases, particularly when the supporting soil structure is formed of stable rock and gravel, a seawall may be poured directly in place. In some cases, it may be possible to place a precast concrete seawall at the water edge without previously pouring a concrete footing.

The problem with seawalls of all types, including concrete seawalls, is that, while they are attractive in appearance and neatly separate the earth from the water, they are not natural surfaces to the marine life and wildlife normally found in and around the water environment.

It is an object of the present invention, therefore, to provide a seawall system comprising a concrete seawall and means for providing a footing upon which the seawall rests. The seawall of the present invention has a lower portion provided to be below the normal water level and an upper portion provided to be above the normal water level, a top, a bottom to rest upon the footing means, a back to face the earth and away from the water, and a front to face the water. The front of the seawall of the present invention has an upper front panel above the normal water level and a lower front panel below the normal water level. The seawall is formed to have a plurality of recesses in the said lower front panel providing nesting places and habitats for marine life and other wildlife normally found in the water environment.

It is another object of the present invention to provide such a seawall formed with a plurality of recesses in the upper front panel providing nesting places and habitats for birds and wildlife normally found around the edge of a body of water.

It is still another object of the present invention to provide such a seawall in which at least some of the recesses in the lower front panel extend entirely through the seawall to permit marine life and such other wildlife normally found in and around the water to have access to nesting in the earth against the back of the seawall.

It is a further object of the present invention to provide such a seawall in which at least some of the recesses in the upper front panel are similarly extending entirely through the seawall to permit wildlife to have access to the earth behind the seawall.

Another object of the present invention is to provide such a seawall in which at least some of the recesses are formed with irregular floor surfaces and depressions for traction and for promoting growth of plant life in the recesses.

Still another object of the present invention is to provide such a seawall including means providing shelves extending outwardly from the lower front panel into the water to provide platforms upon which marine life can nest. Such shelves may be provided, for instance, by forming the seawall with horizontally elongated, vertically narrow slots into which panels of various types may be inserted to have a portion extending outwardly into the water.

A further object of the present invention is to provide such a seawall which is formed to have a ledge between the lower front panel and the upper front panel upon which bricks, stones or other decorative rocks may be placed for decorating the seawall above the water level.

Other objects and features of the present invention will become apparent as this description progresses.

BRIEF DESCRIPTION OF THE DRAWINGS

The detailed description particularly refers to the accompanying figures in which.

DETAILED DESCRIPTION OF THE DRAWINGS

Figure 1:
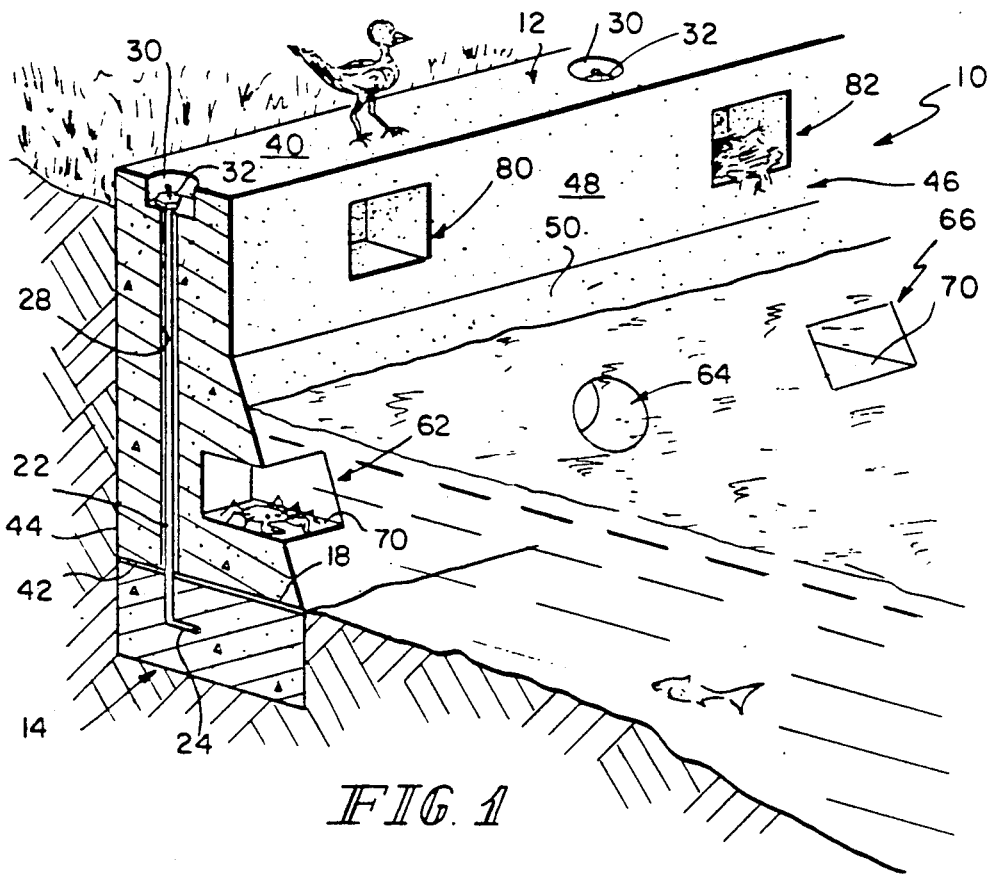
FIG. 1 is a partial, cut-away perspective view showing a seawall in accordance with the present invention.

Referring specifically to FIG. 1, it will be seen that the seawall system 10 of the present invention comprises a concrete seawall 12 and means 14 for providing a footing upon which the seawall 12 rests. The illustrative footing means 14 in FIG. 1 is a poured concrete footing with sufficient vertical depth and front-to-back depth (perpendicular to the length of the seawall) to give a sufficient structural bearing for the seawall 12. The footing means 14 may be poured in place or, for that matter, prefabricated and placed in a trench to provide a horizontally extending top plane surface 18 upon which the seawall 12 rests.

In some types of soil, particularly when the soil is primarily sand and gravel, the soil itself may be prepared, for instance, with rocks or heavy gravel to provide a footing means sufficiently stable to support a seawall 12. In this application, and in the appended claims, the terms "means for providing a footing" may take many forms including the poured in place concrete form illustrated at 14 in FIG. 1, a prefabricated concrete footing which may be installed in the ground next to the water or a footing which may be formed from the soil structure itself by some means.

In the FIG. 1 embodiment, the seawall 12 is illustratively attached to the footing means 14 by means of steel tie rods 22, only one of which is shown, the lower ends 24 of which may be anchored in the footing. The tie rods 22 may extend upwardly through openings indicated at 28 which are enlarged at the top as indicated at 30 to provide room for some sort of connecting means as indicated at 32. In other words, attachment means, such as the illustrative tie rod 22, may be used to fasten a seawall 12 to a footing means 14.

The illustrative seawall 12 is formed or cast to have a top 40, a bottom 42 resting upon the footing means 14, a back 44 to be against the earth and away from the water, and a front 46 facing the water.

The front 46 has an upper front panel 48 and a lower front panel 50, with the upper front panel above the normal water level and the lower front panel 50 below the normal water level. In the illustrative embodiment of FIG. 1, the upper portion of the seawall 12 is somewhat more narrow than the lower portion, and in fact the lower front panel 50 inclines downwardly and toward the water to provide the inclined surface illustrated. Thus, the base or bottom 42 of the seawall 12 is considerably thicker than the upper portion of the seawall at the top 40.

In accordance with the present invention, the seawall 12 is formed to have a plurality of recesses 62, 64, 66 in the lower front panel 50. These illustrative recesses 62, 64, 66 are formed in the concrete body of the seawall 12 to provide nesting places and habitats for marine life and other wildlife normally found in the water environment. The illustrative recesses 62 and 66, for instance, may be formed to define rectangularly shaped recesses having floors 70 on which marine life can nest. The floors 70 may be ribbed or formed with small depressions. The illustrative recess 64, for instance, is merely a circular recess.

Further, in the illustrative embodiment of FIG. 1, recesses 80 and 82 are provided for birds' nests or any other habitats for animals that may be found in or near a water environment.

It will be appreciated that all of the recesses 62, 64, 66, 80, 82 may be formed when the concrete is cast by attaching protrusions on the form panels which define the upper front panel 48 and lower front panel 50. It will also be appreciated that these recesses may take generally any shape and have any desired depth in the vertical direction, width in the horizontal direction (along the seawall) or length in the direction toward the earth, i.e., through the seawall 112. Openings, such as the illustrated opening 28 for the tie rod 22 may be formed simply by placing inexpensive plastic pipe or other such form producing bodies within the concrete form. The cavities 30 at the tops of the openings 28 may similarly be formed from plastic cups or other form producing bodies. The illustrative concept, therefore, is to provide a precast seawall 12 already formed to have in it various recesses which promote the growth and care of marine life and wildlife associated with water environments. Even when a seawall 12 is poured in place, the forms used may have protrusions on the panels which define the upper front panel 48 and the lower front panel 50 to define the cavities 62, 64, 66, 80 and 82. If the seawall 12 is poured in place, of course, it can be poured around the tie rod 22 to eliminate the need for the precast opening 28 or for the fastening element 30.

Figure 2:
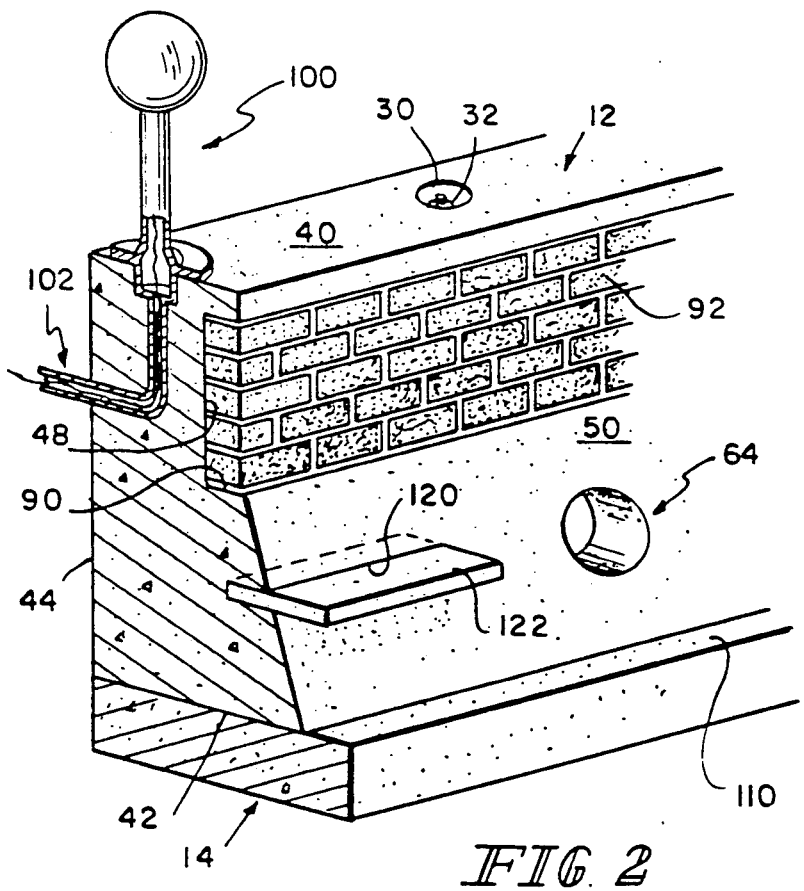
FIG. 2 is a partial, cut-away perspective view showing a modification of the seawall of FIG. 1, particularly a modification permitting a decorative facade to be placed on the upper front panel above the normal water level.

Referring now to FIG. 2, like reference numerals representing like parts, it will be seen that the seawall 12 may be modified, for instance, to form a horizontally extending, upwardly facing ledge 90 upon which some bricks 92 may be laid as indicated to cover the upper front panel 48 for decorative purposes. To provide more decoration, a lighting fixture 100 may be mounted on the top 40 as indicated and connected by wiring 102 which may be embedded under the earth behind the back 44. It will be appreciated that stones or other decorative facades may be placed on the ledge 90 to be above the water level and above the lower front panel 50. The FIG. 2 structure is also formed such that the footing means 14 itself is thicker than the bottom 42 of the seawall 12 to provide a ledge 110 upon which marine life may form a nest or habitat. The lower portion of the seawall 12 in FIG. 2 is also formed with a vertically narrow, horizontally elongated slot 120 into which a board or other panel 122 may be inserted to provide an upwardly facing platform upon which marine life can nest or form a habitat. It will be appreciated that a plurality of such panels or platforms 122 may be provided on a seawall 12 in accordance with the present invention.

Figures 3, 4:
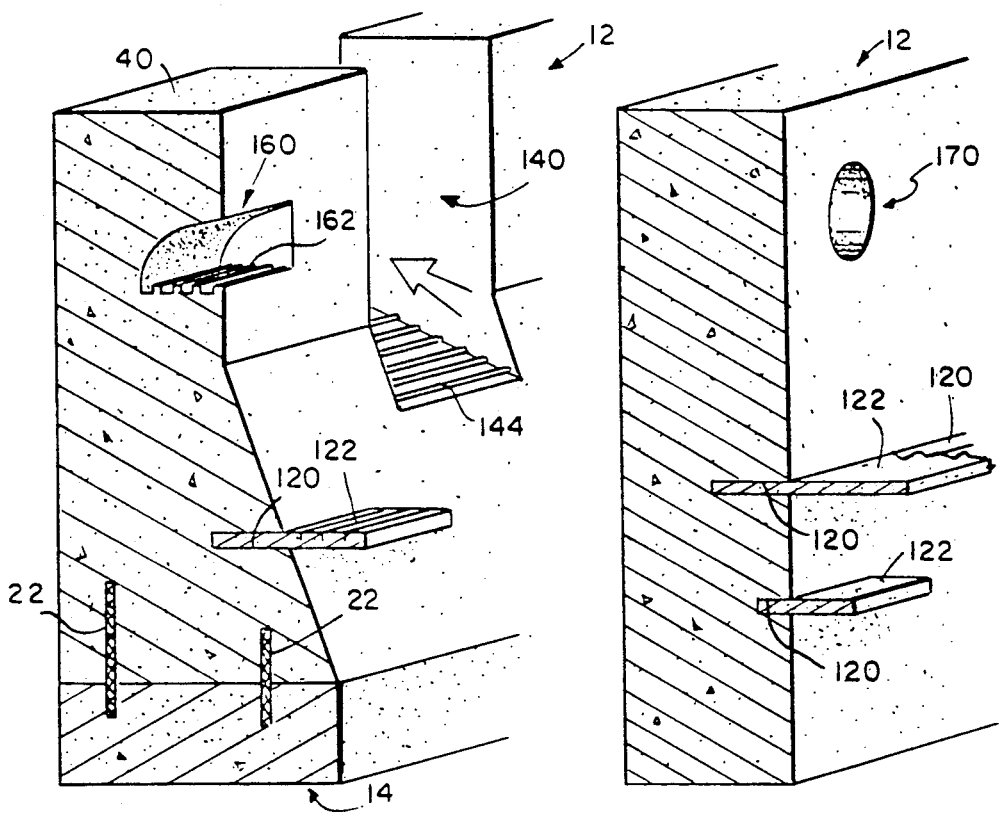
FIG. 3 shows a fragmentary perspective view showing another embodiment of the seawall of the present invention.
FIG. 4 shows a fragmentary perspective view of still another embodiment of the seawall of the present invention.

Referring now to FIG. 3, like reference numerals representing like parts, it will be seen that a different type of seawall 12 is placed upon a footing means 14, probably poured in place on the footing means 14 although it may be precast and just placed on the footing means 14 as indicated above. Tie rods, such as indicated at 22 may be provided for attaching the seawall 12 to the footing means 14. The illustrative seawall 12 in FIG. 3 is formed to have a cut or opening in the top 40 to provide a ramp walkway 140 for animals and, for instance, ducks or geese, which may want to leave the water and walk upwardly through the seawall 12 to the earth behind the seawall. The ramp walkway 140 may have an inclined ramp surface 144 which is ribbed or otherwise formed to provide tread means to facilitate the walking of the animals upwardly. It will be appreciated that this type of opening may be formed in a number of different ways to provide an inclined ramp walkway 140 upwardly from the water level to a point behind the seawall, i.e., to the left as viewed in FIG. 3. The FIG. 3 structure is shown with a panel 122 inserted in a slot 120 to provide a platform and also shown with a different type of recess 160, the bottom of which may be ribbed or otherwise formed to have ridges or depressions in it to support growth of material supportive of animal and marine life.

FIG. 4 represents a seawall 12 of a different shape, i.e., a rectangular cross sectional shape, which may be poured in place without footings if the subsoil will tolerate the weight, and with slots 120 for receiving panels 122 and with an illustrative recess 170 which may be circular in cross sectional shape.

Figures 5, 6:
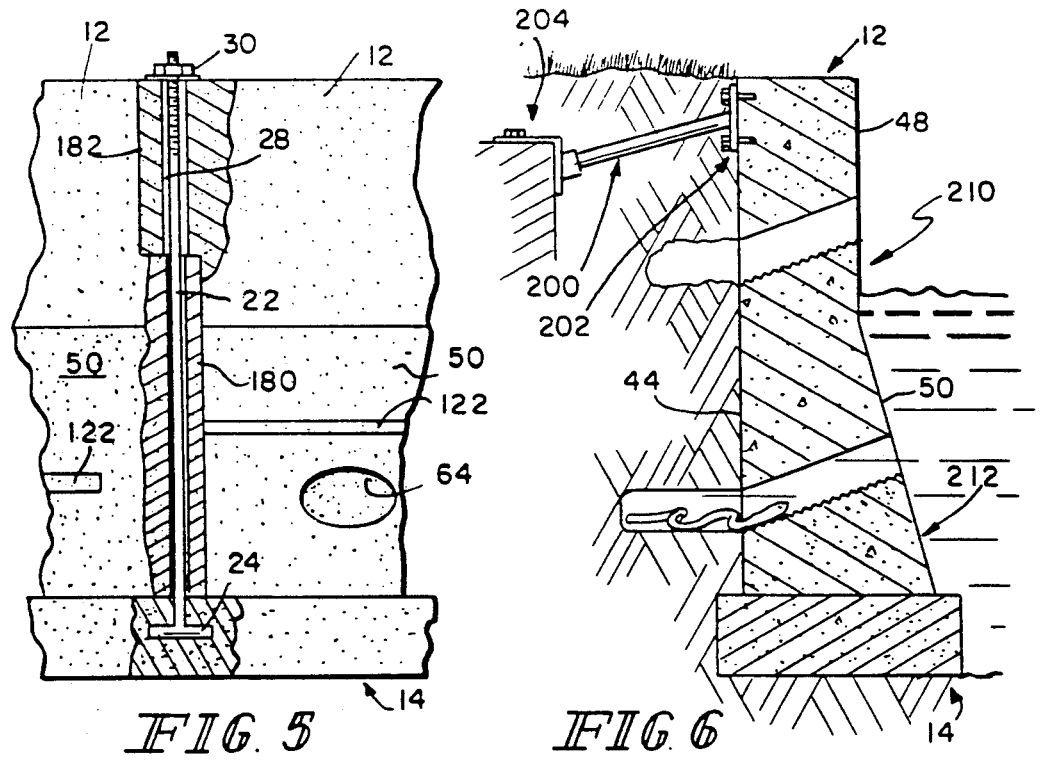
FIG. 5 is a fragmentary front plan view, partially broken away, to show how two seawall sections may be joined together and connected to a footing means.
FIG. 6 is a transverse sectional view showing an installed seawall of the present invention.

Referring now to FIG. 5, it will be seen that two seawall 12 sections may be joined together by a single tie rod 22 which is anchored as indicated at 24 in the footing means 14 and which extends upwardly through openings 28 in adjacent sections. Particularly, the section to the left as viewed in FIG. 5 has a lower portion 180 extending outwardly to be under an upper portion 182 of the section to the right. These portions 180, 182 are in a vertical arrangement with their openings 28 in alignment to receive the single tie rod 22 so that both sections of the seawall 12 may be held by the single tie rod 22 and its fastening means 30. It will be appreciated, however, that a number of different types of elements may be used for holding adjacent sections of a precast seawall 12. In the illustration in FIG. 5, a circular recess 64 is shown and shelves 122 are also shown.

Referring now to FIG. 6, it will be seen that the illustrative seawall 12 resting upon the illustrative footing means 14 may further be anchored by means of a connecting brace 200 attached between the upper portion of the seawall 12 as indicated at 202 and a concrete foundation piece indicated at 204. Further, in the embodiment of FIG. 6, it will be seen that recesses such as indicated at 210 and 212 respectively, in the upper panel 48 and the lower panel 50, may extend entirely through the seawall to provide access to the earth behind the back 44 of the seawall. The lower recess 212, for instance, may be inclined rearwardly (toward the earth) and downwardly as illustrated so that marine life or other animal life in the water environment, such as the illustrated snake, may form a nest in the earth behind the seawall. The upper recess 210 in the upper front panel 48 may similarly be inclined to the rear and downwardly, for instance, to provide an opening through which plant life may grow from the earth out through the seawall 12. These recesses 210, 212 may be formed with bodies which will produce at least on the bottoms of the recesses surfaces having depressions or ridges to promote aquatic growth of various types.

The various recesses shown in the drawings may incline upwardly or downwardly into the concrete, and they may go at an angle laterally into the concrete. The recesses may have various shapes and sizes to accommodate various types of marine life and wild life.

What is claimed is:

1. A seawall system for a non-turbulent water environment comprising a concrete seawall and means for providing a footing upon which said seawall rests, said seawall having a lower portion provided to be below a normal water level and an upper portion provided to be above the normal water level, a top, a bottom to rest upon said footing means, a back abutting against an earth area and away from a non-turbulent body of water, and a front to face the non-turbulent body of water, said front having an upper front panel above the normal water level and a lower front panel below the normal water level, said seawall being formed to have a plurality of recesses extending through said seawall from the front to the back in said lower front panel providing non-turbulent water covered nesting places and habitats for marine life and other wildlife normally found in the non-turbulent water environment.

2. The system of claim 1 in which said seawall is further formed with a plurality of recesses in said upper front panel providing nesting places and habitats for birds and wildlife normally found around an edge of a non-turbulent body of water.

3. The system of claim 2 in which at least some of said recesses in said lower front panel extend entirely through said seawall to permit marine life and such other wildlife normally found in the non-turbulent body of water to have access to nesting in the earth against the back of said seawall.

4. The system of claim 3 in which at least some of the recesses in said upper front panel extend entirely through said seawall to permit marine life and such other wildlife normally found in the non-turbulent body of water to have access to nesting in the earth area against the back of said seawall.

5. The system of claim 2 in which at least some of said recesses are formed with irregular surfaces and depressions for traction and for promoting growth of plant life in said recesses.

6. The system of claim 1 including means providing shelves extending outwardly from said lower front panel into the non-turbulent body of water to provide platforms upon which marine life can nest.

7. The system of claim 6 in which said shelf providing means comprises panels inserted into recesses formed in said seawall.

8. The system of claim 1 in which said seawall is formed to include horizontally elongated, vertically narrow slots in said front, and further comprising means providing shelves extending, respectively, into said slots to provide platforms upon which marine life can nest.

9. The system of claim 1 in which said seawall is formed to have a ramp walkway for small animals leading from the non-turbulent body of water upwardly through said seawall to the earth area.

10. The system of claim 9 in which said ramp is defined by a cutout through said top in said upper portion, said ramp being provided with tread means to facilitate a climbing walk of small animals up the ramp walkway.

11. A seawall system for a non-turbulent water environment comprising a plurality of seawall sections formed to be placed upon a footing means located adjacent a non-turbulent body of water with the seawall system proportioned and designed to provide an effective rigid boundary between the non-turbulent body of water and an earth bank adjacent the water to prevent erosion as well as to provide a pleasant appearance, each seawall section having a lower portion provided to be below a normal water level and an upper portion provided to be above the normal water level, a top, a bottom to rest upon the footing means, a back to abut the earth bank and away from the non-turbulent body of water, and a front to face the non-turbulent body of water, said seawall being formed to have a plurality of recesses extending through said seawall section from the front to the back and projections protruding outwardly into the non-turbulent body of water to provide non-turbulent water covered nesting places and habitats for marine life and other wildlife normally found in the non-turbulent water environment.

12. The system of claim 11 in which said seawall section is formed so that said front has an upper front panel above the normal water level and a lower front panel below the normal water level, said seawall section being formed to have said recesses and projections in said lower front panel to be below the normal water level.

13. The system of claim 12 in which said seawall section having an elongated and horizontally extending ledge providing a boundary between said upper front panel and said lower front panel and to provide a support upon which a decorative facade can be placed against said front panel.

14. The system of claim 11 in which at least some of said recesses are formed to extend entirely through said seawall to provide a nesting place behind the seawall in the earth bank.

15. The system of claim 11 in which at least some of said recesses are inclined from said front downwardly and toward said back to extend entirely through said seawall section.

16. The system of claim 11 in which at least some of said recesses are formed with floors provided with irregular surfaces to promote growth of plant life.

17. The system of claim 11 in which adjacent seawall sections are provided with interlocking projections and further comprising fastening means extending through said interlocking projections to attach said seawall sections together and to the footing means.

18. The system of claim 11 further comprising means for anchoring each seawall section, each anchoring means comprising foundation means rigidly disposed in the earth bank to the back of said back of said seawall section and a connector rigidly fastened between said foundation means and said seawall section.

19. The system of claim 11 in which said projections are provided by forming vertically narrow, horizontally elongated slots extending into said seawall section and panels inserted into said slots to provide a portion extending outwardly from said front.

20. The system of claim 11 in which at least some of said seawall sections are formed to provide a cutout section through said upper portion providing an inclined ramp walkway for animals leaving the non-turbulent body of water to walk upwardly through said cutout to the earth bank behind said seawall section.

* * * * *